Sept. 8, 1953  A. LE PECHOUX  2,651,295
ROTARY ENGINE
Filed May 11, 1950  4 Sheets-Sheet 3
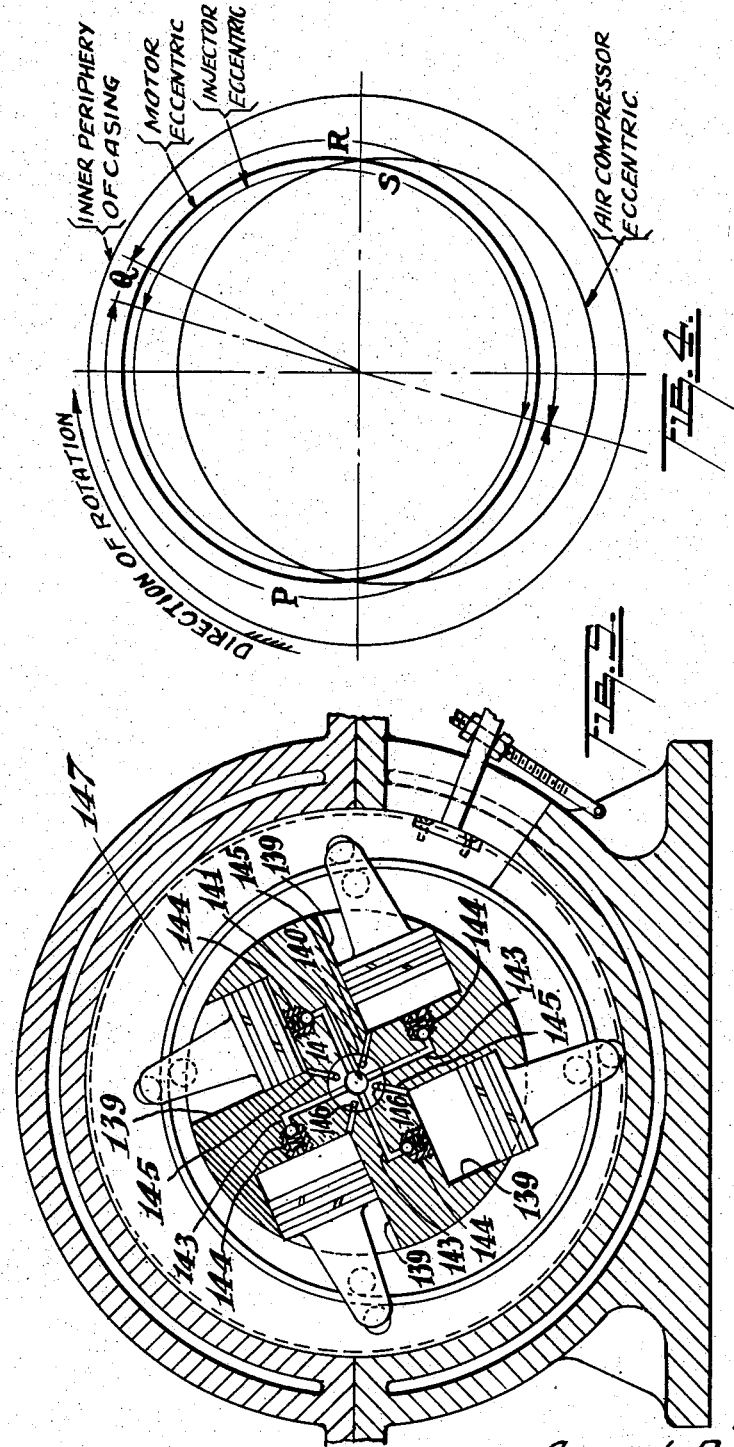
INVENTOR
ANDRE LE PECHOUX
By Stebbins, Blenko & Co.
ATTORNEYS

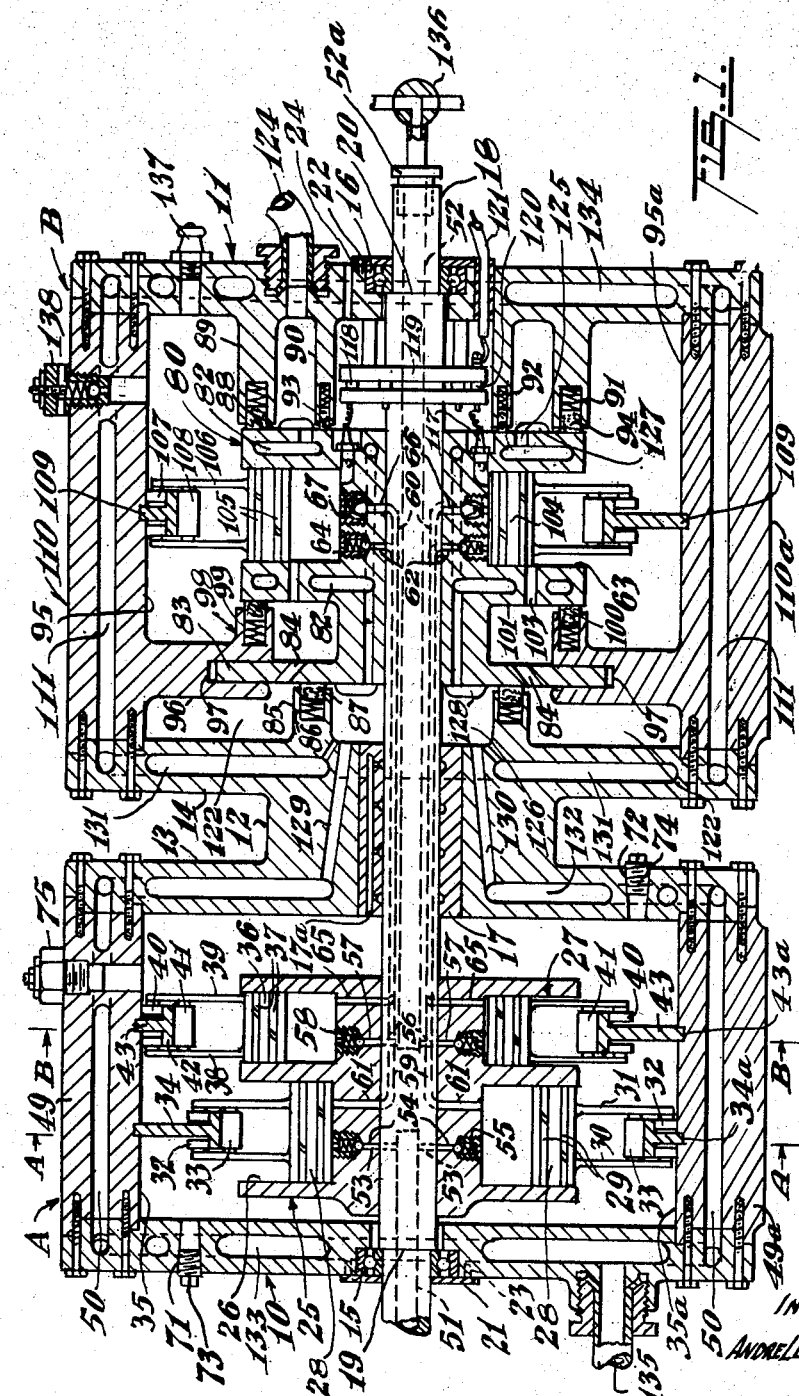

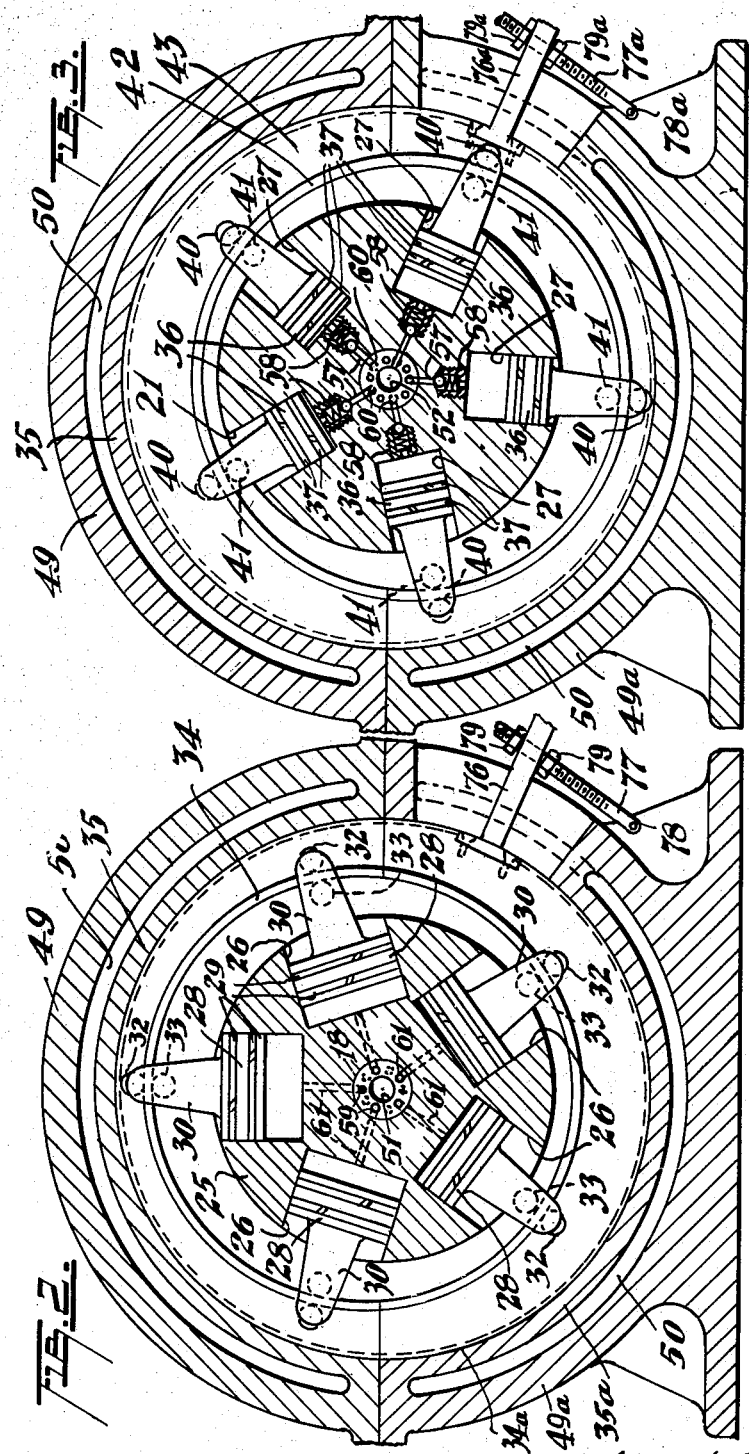

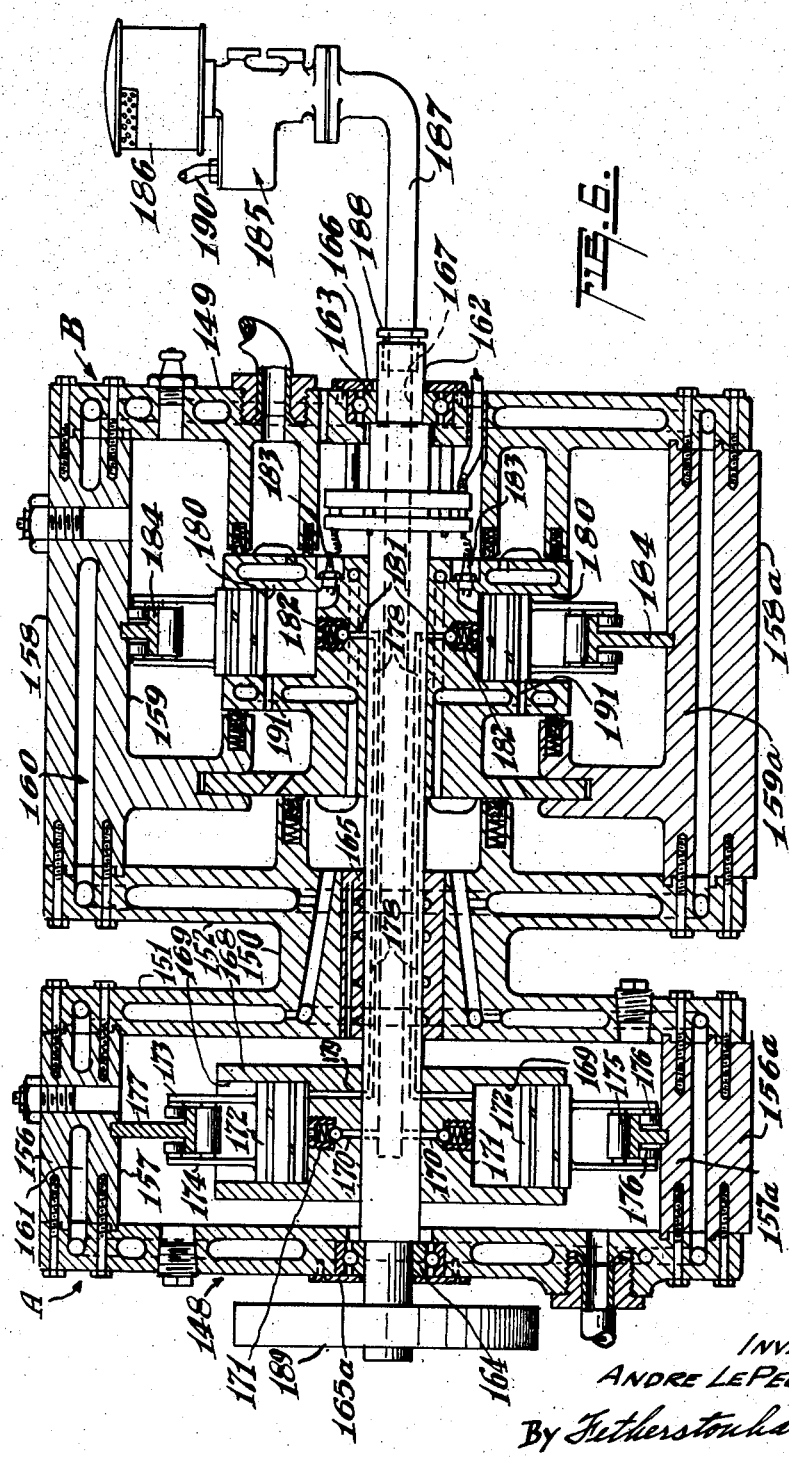

Patented Sept. 8, 1953

2,651,295

UNITED STATES PATENT OFFICE 2,651,295

ROTARY ENGINE

André Le Pechoux, Des Chenes, Quebec, Canada

Application May 11, 1950, Serial No. 161,300

4 Claims. (Cl. 123—44)

My invention relates to a new rotary engine of the internal combustion type, and has as its principal object the provision of a rotary engine which is relatively simple in construction and compact in form and which may be either a diesel or ignition engine.

It is also an object of my invention to provide a two-cycle diesel or ignition type rotary engine, which is particularly adapted to operate at speeds of from 4,000 to 5,000 R. P. M.

It is a further object of my invention to provide such an engine which will be easy to maintain in operation and requires a minimum of maintenance and lubrication once it has been assembled.

It is a still further object of my invention to provide a diesel engine which has a relatively small weight to horsepower ratio.

Further objects and advantages of my invention will appear from the following detailed specification taken in conjunction with the accompanying drawings which illustrate, by way of example, several embodiments of my invention.

In the drawings:

Fig. 1 is a longitudinal cross-sectional view of a diesel engine according to the invention showing the relative positions of the various parts of the compressor and the motor.

Fig. 2 is a transverse cross-section of the compressor mechanism taken along the line A—A of Figure 1.

Fig. 3 is a transverse cross-section of the injector mechanism taken along the line B—B of Figure 1.

Fig. 4 is a schematic illustration of the cycle of operations of a diesel engine according to the invention.

Fig. 5 is a transverse cross-section of an engine according to the invention, showing an alternative arrangement of cylinders.

Fig. 6 is a longitudinal cross-section of an internal combustion engine according to the invention, adapted to run using gasoline as a fuel, with an electrical ignition system.

Referring to Figures 1, 2 and 3, a diesel engine according to my invention comprises casing elements arranged to provide a housing A for the compressor and injector mechanism and a second housing B for the engine proper. As illustrated the casing comprises the end walls 10 and 11 and the central spacer member 12 which is formed to provide the adjacent walls 13 and 14 of the housings A and B respectively. The end-walls 10 and 11 and the spacer member 12 are suitably bored and tapped to accommodate the bearings 15, 16 and 17 respectively which rotatably mount the shaft 18. The shaft is suitably shouldered into the bearings 15 and 16 as shown at 19 and 20 and the bearings 15 and 16 (and thus the shaft 18) are retained by the retaining plates 21 and 22 which are suitably secured to the end walls 10 and 11 for instance by screws 23 and 24.

Within the housing A, and secured to the shaft 18 in any suitable manner, for instance by splining therewith, is the compressor and injector block 25. The block 25 is formed preferably with an odd number of radial compressor cylinders 26. In the embodiment illustrated there are five such cylinders, but it will be understood that the number may be varied to suit any particular design and size of motor. The block 25 is also provided with an injector cylinder 27 corresponding to each compressor cylinder 26. As illustrated, the injector cylinders 27 appear a great deal larger than they would normally be in the actual engine. This enlargement in the drawings has been made for the sake of clarity in illustration, the injector cylinder will actually be very small in comparison to the compressor cylinder since the actual size thereof governs the amount of fuel metered to the engine for each power stroke.

Each compressor cylinder 26 is provided with a piston 28 suitably sealed by the piston rings 29, and the pistons 28 are provided with the connecting extensions 30 and 31 which are suitably formed integrally therewith and are provided with suitable means to mount the rollers 32 and 33 respectively. The rollers 32 and 33 are arranged to follow the circular track provided by the flanged rail 34 which is circular and which is mounted eccentrically to the shaft 18. The rail 34 is in turn secured to the inner cover 35 and 35a of the housing A, which is suitably of split design to permit easy dismantling and assembly.

Each injector cylinder 27 is provided with an injector piston 36, provided with suitable piston rings 37 and formed integral with the extensions 38 and 39 which provide mountings for the followers 40 and 41 which ride upon the circular back 42 provided by the flange of the flanged rail 43.

An outer casing 49 and 49a is provided which is generally similar to the inner casing and of similar split design to provide the space 50 between the inner casing 35 and the outer casing 49 in which cooling fluid may be circulated.

The shaft 18 is of fairly large diameter and is provided with the co-axial passageways 51 and 52. The passageway 51 is for the intake of air to the compressor cylinders 26, and for that purpose has a radial port 53 for each cylinder 26 which registers with the radial intake passage 54 of each cylinder 26. Each intake passage 54 is provided with the non-return valve 55 which is suitably of the spring and ball type.

The passage 52 is the fuel intake and for that purpose is provided with radial passageways 56 leading to each of the fuel intake passageways 57 in which are situated the the non-return valves 58 which are also suitably of ball and spring design.

The channel 52 is provided at its end with a slip ring connection 52a which is connected to suitable oil and gasoline supplies (not shown).

In addition there is a compressed air channel 59, and a fuel injector channel 60 for each cylinder of the compressor and injector cylinders respectively.

The compressed air channels 59 register at one end with the radial ports 61 which communicate with the interior of the compressor cylinders 26. The other end of the channels 59 register with the radial ports 62 which lead to the motor cylinders 63, and which contain the non-return valves 64 which are also of suitable ball and spring design.

The fuel injector channels 60 register at one end with the radial outlet ports 65 of the injector cylinders 27. The other ends of the channels 60 register with the motor fuel intake ports 66 which contain the non-return valves 67 which are of conical shape, to provide some jolting action on the liquid fuel as it is forced into the motor cylinders 63.

The housing A is designed to be substantially filled with lubricating oil during operation of the engine, and for this purpose the filling hole and drain hole 71 and 72 are provided, which are closed by the plugs 73 and 74 respectively. A safety valve 75 is also provided to prevent undue pressure from building up within the housing A due to the heat generated during operation of the compressor. The bearing 17 may suitably be lubricated with oil from the housing A through the oil channel 17a.

The housing B contains the cylinder block 80 which is secured to and rotates with the shaft 18. The block 80 is provided with a cylinder 63 corresponding to each cylinder 26 of the compressor in housing A. As will be explained later, the cylinders 63 are appreciably smaller in diameter than the cylinders 26. The block 80 is suitably bored and channeled to provide for the circulation of cooling fluid through the spaces 82. One end of the block 80 is formed into a flywheel 83 which is pierced by a number of holes 84 for passage of exhaust gases. The wall 14 of housing B is provided with an annular extension 85 which is grooved at its periphery at 86 to house the spring-loaded sealing and packing ring 87 which rides against the face of the fly-wheel 83. The other end of the block 80 is provided with a flat circular face 88, and the wall 11 of the housing B is provided with two annular extensions 89 and 90, provided about their periphery with the grooves 91 and 92 which seat the spring-loaded sealing packing rings 93 and 94 which ride against the face 88. The housing B is provided with the split inner casing 95 and 95a which is provided with the internal flange 96, grooved at 97 to fit freely around the fly-wheel 83. The internal flange 96 is provided with the annular extension 98 grooved at 99 to seat the circular spring-loaded packing and sealing ring 100 which rides against the flat circular face 101 which is formed in the block 80. Each cylinder 63 is provided with an exhaust port 103. Each cylinder 63 is provided with a piston 104 having suitable piston rings 105. The pistons 104 are similar to the compressor pistons 28 and are provided with the extensions 106 which mount the rollers 107 and 108 which ride on the eccentric circular track 109 which is secured to the inner casing 95 and 95a. An outer split casing 110 and 110a surrounds the inner casings 95 and 95a and provides the space 111 for circulation of cooling fluid.

The engine is started as a gasoline engine and for this purpose each cylinder 63 is provided with a spark plug 117 which is connected to a brush 118 which rides on a stationary distributor ring 119 which is provided with a point 120 which is set to provide spark as each brush passes over and away from it. The point 120 is connected to the high tension coil of a suitable ignition system (not shown), by the high tension line 121.

The engine described above is designed for operation at high speed and is designed to give maximum efficiency at speeds in the neigrborhood of 4,000 to 5,000 R. P. M. For this reason the motor is started as an ignition gasoline engine and is switched over to diesel operation only when it is thoroughly warmed up and has been brought up to the required speed.

When operating as a diesel engine the sequence of operations is as follows:

As the compressor piston moves away from the top dead centre position, illustrated by the lower cylinder in Figure 1, the rollers 32 bearing against the eccentric track 23 draw the piston 28 up the cylinder 26, opening the non-return valve 55, drawing in air through the channel 51 and the ports 53 and 54 until the bottom dead centre position of the cylinder and piston is reached, as illustrated in the lower part of Figure 1. As the cylinder 26 and the piston 28 move on past the bottom dead centre position, compression of the air within the cylinder 26 begins to take place. It will be noticed, however, that the eccentricity of the eccentric track 109 of the motor is 180° out of phase with that of the compressor so that as the compressor cylinder moves away from top dead centre and commences its compression stroke, the motor cylinder 63 is beginning to move away from top dead centre and is commencing its power stroke. Thus the pressure of the explosion within the cylinder 63 will hold closed the non-return valves 64 and 67 until the motor cylinder 63 has travelled around to a point where the exhaust port 103 is unmasked by the rising piston 104, which is just before the completion of the power stroke and the bottom dead centre position. At this point the compressor piston is nearly in the top dead centre position and the air in the cylinder 26 and in the passageway 59 is in a high state of compression. Accordingly, as soon as the exhaust port 103 is uncovered, the exhaust gases pass outwardly through the holes 84 in the flywheel 83 into the exhaust manifold 122. The pressure within the cylinder 63 drops rapidly and the highly compressed gases within the compressor cylinder 26 and the channel 59 force open the non-return valve 64 and rush into the cylinder 63 scavenging the exhaust gases and filling the cylinder with air at a predetermined pressure. If the timing of the motor is correct, scavenging will be complete just as the piston 104 has moved past dead-centre and downwardly to the point where it completely shuts off the exhaust port 103. It will be appreciated that the degree of compression of the air in the cylinder 63 at this point will depend upon the ratio of the swept volume of the cylinder 26 to the volume of the cylinder 63 with the piston 104 in a position wherein the exhaust port 103 is just barely closed.

The eccentric track 42 which controls the injector cylinder 27 is set with its top dead-centre positions at an angle of from 20 to 40° behind the bottom dead-centre of the compressor eccentric. It will be obvious that when the injector piston moves up the cylinder 27 it will suck in fuel from the channel 52 through the port 57 and non-return valve 58 while as it descends it will close the non-return valve 58 and force fuel through the channel 60 and the port 66 and jet valves 67 into the cylinder 63. The eccentric track 42 is arranged so that injection into the cylinder will commence approximately when scavenging is complete and the piston 104 is engaged in its compression stroke. Injection is complete when the piston 104 has passed its top dead-centre position by an angle of approximately 20 to 40°.

As those who are familiar with the diesel will appreciate, the compressed air and fuel will commence to ignite as the piston 104 approaches the top dead-centre position. However, because of the high speed of operation of the engine and the momentum of the moving parts, including the fly-wheel 83 and, if desired, an additional external fly-wheel on the shaft 18, the piston 104 will quickly be carried past the top dead-centre position and, at an engine speed of 4,000 to 5,000 R. P. M. maximum force will not be generated by the exploding mixture until the piston 104 is well past the top dead-centre position and the roller 108 is riding on a portion of the track 109 where the tangent to the track is at a substantial angle to the axis of thrust of the piston 104. Thus, ideally, the timing of the engine will be adjusted so that maximum thrust occurs between 45° and 90° after top dead-centre position.

It will be appreciated that in designing the motor it will be necessary to select a total compression ratio which will provide for spontaneous ignition of the mixture at the normal operating temperature of the engine just slightly before the piston 104 arrives at top dead-centre because the earlier that the ignition occurs the faster it will be necessary to operate the engine in order to have the maximum thrust exerted by the piston 104 on the appropriate portion of the track 109.

On the other hand, if it is desired to construct an engine which will operate at slow speeds it will be necessary to construct a track 42 controlling the injector piston 36, with a cam-rise so that injection will occur almost instantaneously just after the motor piston 104 has passed top dead-centre position because at slower speeds there will not be sufficient momentum in the machine to carry the motor cylinders past top dead-centre if ignition is allowed to occur before that point. I do not prefer this construction however, because it precludes the possibility of operating at the high speeds previously mentioned due to excessive wear and stress on the cam-rise and it does not permit the smoothness of operation which is a feature of the motor according to my invention when properly constructed to operate at high speeds.

For purposes of adjusting the timing of the engine, the circular tracks 34, 43 are designed to fit within the circular grooves 34a, 43a respectively, in the inner casing 35 and 35a, and are rotatable with respect to the casing. The position of the tracks is adjustable, the adjustment being effected by means of the arms 76 and 76a (see Figures 2 and 3), which are rigidly secured to the tracks 34 and 43, and which are secured in a selected position of adjustment by the pins 77 and 77a pivoted to the casing at 78 and 78a and suitably screw-threaded to mount the adjustment nuts 79 and 79a.

In the embodiment illustrated in Figures 1, 2 and 3, provision is made for the cooling of the engine by circulation of fluid through the casing as well as through the engine block itself. The cooling fluid, which may be water or ethylene glycol or any other suitable fluid, is stored in a radiator (not shown) from where it passes into the engine through the port 124 in the end wall 11 of casing B, from where it passes in through the openings 125 in the block and through the channels 82 in the block and out into the annular space 126, the vanes 127 and 128 being provided to cause continuous circulation of the fluid. From the annular space 126 the water passes through the channels 129 and 130 in the spacer member 12 into the spaces 131 and 132 which are connected with the spaces 50 and 111 in the casings A and B respectively, and which also communicate with the spaces 133 and 134 in the end walls 10 and 11 respectively. Finally, the cooling fluid passes out the outlet port 135 and returns to the radiator.

As previously mentioned, operation of the engine is commenced using gasoline as a fuel and with spark plug ignition. To start the engine the fuel inlet valve 136 which is designed either to permit flow of oil from the oil reservoir, or gasoline from the gasoline tank, is adjusted to permit flow of gasoline only, and the ignition system is switched on. The engine is turned over either by a suitable hand cranking arrangement, or more suitably, by means of an electric starting motor (not shown). The sequence of operations taking place is the same as previously described when operating as a diesel engine, except that ignition is effected by means of the spark plugs 117 which are timed to ignite the mixture in the cylinder 63 at a point just slightly past top dead-centre. The engine is brought up to normal operating speed as quickly as possible and thereafter as soon as the temperature of the cooling liquid indicates that normal operating temperature has been reached the valve 136 is switched over to supply only diesel oil to the channel 52 and the ignition is switched off, the engine thereafter carrying on as a diesel engine.

The parts within the casing B are lubricated by means of grease and the casing is accordingly provided with a grease nipple 137 and a safety valve 138. During operation of the engine the heat within casing B lowers the viscosity of the grease and the rotation of the block, and reciprocation of the pistons beats the grease into a fine mist which lubricates both the rollers 107 and 108 and the track 109 as well as the walls of the cylinders 63 and the piston 104.

The cycle of operations of the diesel engine described above is illustrated schematically in Figure 4. Referring to Figure 4, it will be seen that combustion takes place during the time that the cylinder is travelling through the sector P.

Exhaust and simultaneous scavenging and intake of air takes place in the sector Q. Compression takes place within the sector R, while injection takes place during the sector S.

Figure 5 illustrates an alternative arrangement of the cylinders in the compressor. In this arrangement there are four cylinders 139 arranged substantially chord-wise around the shaft 140. The air intake channel 141 in the shaft 140 is connected by means of ports 143 through the non-return valves 144 to the cylinders 139, and the compressed air leaves the cylinders 139 through the channels 145 in the cylinder block which communicate with the compressed air channels 146 in the shaft 140 which in turn communicate with the motor cylinders.

This arrangement has the advantage that it provides for a longer cylinder stroke for any given degree of eccentricity of the eccentric track 147, but it has the disadvantage that wear on the cylinder and piston walls tends to be considerably increased. It will be appreciated that if desired this form of cylinder construction may be used in the motor and injector mechanism as well as in the compressor.

Referring now to Figure 6, it will be seen that the arrangement of an engine according to the invention, as an ignition engine, is somewhat simpler than in the case of a diesel engine. The structure of the casing, which once again, is arranged to provide the housing A for the compressor, and the housing B for the engine proper, is generally similar to the structure of the casing of the diesel engine previously described except that in view of the lack of necessity for an injector mechanism the housing A is somewhat smaller. As before, the casing consists essentially of the ends walls 148 and 149, the spacer member 150, which is formed integrally with the flangular, adjacent walls of housing A and housing B, 151 and 152 respectively. The top and bottom of the housings A and B are closed by split casings comprising the members 156, 156a, 157, 157a, 158, 158a, 159 and 159a, in precisely the same manner as previously described in connection with Figure 1. Once again, the walls of the housings are hollowed out to provide for circulation of cooling medium and the spaces 160 and 161 are provided between the inner and outer split casings of the housings A and B for additional circulation of cooling medium. The shaft 162 is mounted for rotation within the housings A and B on the bearings 163, 164 and 165, the bearings 163 and 164 being held in position by the bearing plates 165a and 166 respectively. The shaft 162 is provided with a fairly large central channel 167 for the supply of air-fuel mixture to the compressor. The compressor cylinder block 168, which is formed with the compressor cylinders 169 which are suitably bored to provide for communication between each cylinder and the air intake channel 167 by means of the intake ports 170 which are provided with the non-return valves 171 which are suitably of the ball and spring type. The pistons 172 are provided with the extensions 173 and 174 which mount the rollers 175 and 176 which are adapted to follow the eccentric track 177 which is secured to the inside of the casing members 157 and 157a.

The shaft 162 is further provided with a feed channel 178 corresponding to each compressor cylinder and in free communication therewith through the radial port 179 in the compressor block 168.

The motor within the casing B is similar in design to that in Figure 1 with the exception that there is only one inlet port for the motor cylinders 180, each of which is in communication with one of the feed channels 178 through the radial ports 181 in which are mounted the non-return valves 182 which are also of a suitable ball and spring design. Each motor cylinder 180 is provided with a spark plug 183 which is fired in precisely the same manner as the spark plugs used in the diesel engine described in connection with Figure 1, while the engine was being started. The eccentric track 184 upon which the rollers of the piston connectors ride is, as in the case of the diesel engine, of substantially opposite eccentricity to the eccentric 177 in housing A.

The engine is provided with a suitable conventional carburetor 185 and air intake filter 186, which are arranged to supply mixture to the channel 167 by means of the feed pipe 187 which communicates with the interior of the channel 167 through a suitable slip-ring arrangement 188. In view of the lighter weight of the compressor block in the case of the engine described in Figure 6, it is desirable to provide the flywheel 189 on the end of the shaft 162.

The engine operates as follows:

Gasoline is fed from a suitable reservoir through the line 190 to the carburetor 185 and as the compressor piston 172 is withdrawn from the position in the top of housing A, air is drawn in through the air filter 186 through the carburetor where it mixes with gasoline through the feed pipe 187, slip-ring 188, and into the channel 167 from where it passes outwardly through the inlet port 170 past the non-return valve 171 and into the compressor cylinder 169. After the piston 172 passes, its fully withdrawn position, which is illustrated in the bottom portion of housing A in Figure 6, the non-return valve 171 is closed and the compression stroke begins. Simultaneously with the commencement of the compression stroke of the compression cylinder 169, the engine cylinder 180 which is associated with the compressor cylinder 169 through the appropriate feed channel 178 is commencing its power stroke and the non-return valve 182 is forced firmly closed by the pressure of the combustion gases. As the compressor piston 172 is forced inwardly the gases within the cylinder 169 and the corresponding feed channel 178 reach a high state of compression. As the motor piston completes its power stroke the exhaust port 191 is unmasked as in the case of the diesel engine, the pressure in cylinder 180 drops rapidly, allowing the compressed gases within the feed channel 178 to force open the non-return valve 182, scavenge the cylinder 180 and fill it with a mixture in a partially compressed condition. By this time, the motor piston has commenced its return journey and has closed off the exhaust port 191, and the piston then continues to descend, further compressing the mixture until just following its top dead-centre position the mixture is exploded by a spark from the spark plug 183, initiating a fresh cycle of operations.

It will be appreciated that in the case of the gasoline engine described in Figure 6, once again the compression ratio will depend upon the relation of the swept volume of the compressor cylinder 169 to the volume of the motor cylinder 180 taken from the point at which the exhaust port 191 is completely blocked off. The total compression ratio is the product of this ratio multiplied by the amount of compression imparted by the compression stroke of the motor piston. Since the total compression ratio will desirably not be greater than 9 to 1, the compressor cylinder 169 and the engine cylinders 180 will suitably be more nearly of equal diameter than is the case in the diesel engine described in connection with Figure 1.

The engine described in connection with Figure 6 is lubricated in the same manner as the diesel engine previously described, and circulation of cooling fluid takes place in similar manner.

While I have described in detail two main embodiments of my invention, one of which is designed to operate as a diesel engine at engine speeds of from 4,000 to 5,000 R. P. M., and the other of which is designed to operate as a gasoline engine, it will be appreciated that a wide variety of modifications to the details of construction illustrated will be possible without departing from the principle of operation which I have described. Furthermore, those skilled in the automotive art will be aware of various manners in which details of construction may be altered to suit the engine for particular purposes. I, therefore, wish it to be understood that my invention is not to be limited to the specific structure disclosed otherwise than in the manner set forth in the appended claims.

What I claim as my invention is:

1. An internal combustion engine comprising casing means defining a compressor housing and a motor housing; a shaft; coaxially aligned bearing means supporting said shaft for rotating substantially centrally within said motor and compressor housings; a motor cylinder block secured to and rotatable with said shaft within said motor housing; a plurality of motor cylinders formed within said motor cylinder block radially to said shaft; piston means for each of said motor cylinders; circular track means eccentric to the axis of said shaft secured to said casing and surrounding said motor cylinders; connector means connected with each of said piston means and provided with roller means arranged to follow said circular track; an exhaust port in each of said motor cylinders so positioned that it is unmasked when the piston is substantially fully withdrawn, said exhaust port communicating with exhaust manifold means; a compressor cylinder block secured to and rotatable with said shaft within said compressor housing; a plurality of compressor cylinders formed in said compressor block radially to said shaft and corresponding in number to said motor cylinders; compressor piston means for each of said compressor cylinders; circular track means eccentric to the axis of said shaft secured to the casing and surrounding said compressor cylinders, the eccentricity of said shaft being substantially opposite to the eccentricity of said circular track means in said motor housing; connector means connected with each of said compressor piston means and provided with roller means arranged to follow said circular track means; air supply passage means formed within said shaft; air inlet port means including non-return valve means communicating between said compressor cylinders and said air supply passage means; a compressed air passage within said shaft for each of said compressor cylinders; a compressed air port effecting communication between each of said compressor cylinders and one of said compressed air passages; means for injecting metered quantities of diesel fuel into each of said motor cylinders at a predetermined time in the cycle of operations of the motor; and means within said housings for effecting lubrication of moving parts within said motor and compressor housings.

2. An internal combustion engine as defined in claim 1 in which the means for injecting metered quantities of diesel fuel to said motor cylinders comprises; injector cylinders formed in said compressor block radially to said shaft and corresponding to each of said motor cylinders; injector piston means for each of said injector cylinders; a third circular track eccentric to the shaft secured to the casing surrounding said injector cylinders; connector means for each of said injector cylinders, provided with roller means for following said third circular track; means for supplying diesel fuel including a fuel supply passage formed in said shaft; fuel port means including non-return valve means affording communication between each of said injector cylinders and said fuel supply passage; a fuel injection passage passing from each of said injector cylinders through the shaft to the corresponding motor cylinder; and a non-return injector valve in each of said injector passages adjacent said motor cylinder; said third circular track having an eccentricity which causes injection of fuel to commence during the cycle of operations of each motor cylinder during the compression stroke substantially as the exhaust port is closed by the motor cylinder.

3. An internal combustion engine as defined in claim 2 in which said third circular track is rotatably adjustable within said casing to alter the timing of the injection of fuel to said motor cylinders, and in which means are provided for securing said third circular track in its adjusted position.

4. An internal combustion engine as defined in claim 1 in which the air supply passage and the fuel supply passage are coaxially aligned, and extend from opposite ends of said shaft towards said compressor block.

ANDRÉ LE PECHOUX.

References Cited in the file of this patent

UNITED STATES PATENTS

| Number | Name | Date |
|---|---|---|
| 1,583,560 | Morris | May 4, 1926 |
| 1,909,271 | Harper et al. | May 16, 1933 |
| 1,976,042 | Skouland | Oct. 9, 1934 |
| 2,501,856 | Simons | Mar. 28, 1950 |